United States Patent Office 3,387,020
Patented June 4, 1968

3,387,020
PREPARATION OF AROMATIC ESTERS BY CATALYTIC DISMUTATION OF AROMATIC ALDEHYDES
Carl E. Handlovits, Midland, and James B. Louch, Coleman, Mich., assignors to The Dow Chemical Company, Midland, Mich., a corporation of Delaware
No Drawing. Filed Oct. 7, 1964, Ser. No. 402,332
8 Claims. (Cl. 260—473)

ABSTRACT OF THE DISCLOSURE

Aromatic esters are prepared by the dismutation of aromatic aldehydes, e.g., $2ArCHO \rightarrow ArCOOCH_2Ar$, catalyzed by an alkali metal complex prepared in situ by interaction of the aromatic aldehyde, an alkali metal and certain aliphatic and heterocyclic ethers.

The dismutation or simultaneous oxidation and reduction of an aldehyde into an equimolar mixture of the acid and alcohol in the presence of a strong inorganic base, or certain metallic catalysts such as nickel and platinum, is commonly known as the Cannizzaro reaction. In the related Tishchenko reaction an amphoteric aluminum alkoxide is used as the catalyst and the aldehyde is transformed into an ester rather than the acid and alcohol. These reactions involve the transfer of an hydride ion from one aldehyde group to another in the presence of a suitable catalyst. Both the Cannizzaro and Tishchenko reactions occur under appropriate conditions with a variety of aromatic aldehydes.

It has now been found that the conversion of aromatic aldehydes into aromatic esters also occurs rapidly under mild conditions in the presence of an alkali metal complex formed by interaction of an alkali metal with the aldehyde in the presence of a small amount of certain liquid aliphatic ethers. These alkali metal complexes are readily prepared in situ by addition of the alkali metal to a mixture of the aldehyde and a small amount of the aliphatic ether. Only a minor amount of the alkali metal complex is required to catalyze rapid conversion of the aldehyde to the ester. The esters are readily isolated in high yield and purity. With an aromatic dialdehyde, such as terephthalaldehyde, useful polyesters are obtained.

The formation of reactive, highly colored addition complexes by interaction of an alkali metal with certain organic compounds has long been known. For example, Scott describes in U.S. Patents 2,023,793 and 2,027,000 the preparation of alkali metal complexes from polynuclear aromatic hydrocarbons in the presence of certain aliphatic ethers. Critical to the formation and stability of these complexes Scott found was a saturated aliphatic ether containing not more than 4 carbon atoms per atom of ether oxygen. Further study revealed that these alkali metal complexes normally involve at least 1 molecule of the aromatic compound and 1 molecule of the aliphatic ether per atom of alkali metal. In dilute solution the solvated complexes are stable up to about the melting point of the alkali metal.

In the present invention, the aromatic aldehyde itself functions as the aromatic moiety in the alkali metal complex. Thus addition of the alkali metal to a mixture of the aromatic aldehyde and sufficient ether to solvate the complex results in the in situ formation of the catalytic alkali metal complex. While any alkali metal can be used, lithium, potassium and particularly sodium are preferred. Alternately, alloys such as the well known sodium-potassium alloys can be used.

Both saturated aliphatic and heterocyclic ethers can be used in this process subject to Scott's restriction that the ether contain not more than 4 carbon atoms per atom of ether oxygen. Particularly suitable are such methyl ethers as dimethyl ether, methyl ethyl ether, 1,2-dimethoxyethane, and the dimethyl ether of diethyleneglycol. Because of availability and convenient boiling points, tetrahydrofuran and 1,4-dioxane are often preferred.

At least one mole of ether is required per mole of alkali metal complex. A larger amount can be used if desired as a solvent or diluent for the aromatic aldehyde.

This process can be used with a variety of monocyclic aromatic aldehydes. In general any aldehyde which undergoes the Cannizzaro or Tishchenko reaction can be readily converted into the related ester by this process. Particularly suitable are monocyclic aromatic mono- and dialdehydes of the formula:

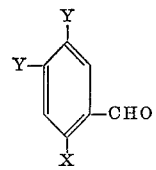

wherein X is a hydrogen, chloro, fluoro, nitro, $C_1$–$C_{12}$ alkyl or $C_1$–$C_{12}$ alkoxy group, and Y is X or —CHO. Because of steric effects at least one hydrogen ortho to the aldehyde group is desirable. Typical aromatic aldehydes include benzaldehyde, o-, m-, and p-methoxybenzaldehyde, o-, m- and p-chlorobenzaldehyde, o-, m- and p-tolualdehyde, terephthaldehyde, 2,5-dimethylterephthaldehyde and isophthalaldehyde.

The concentration of reactants is not critical. In many cases addition to the mixture of aromatic aldehyde and ether of 0.01 to 0.1 mole of alkali metal per mole of aldehyde catalyzes a rapid reaction at room temperature. With a liquid aldehyde only sufficient ether need be added to form the desired alkali metal complex. However, a larger amount of ether can be used as solvent or diluent if needed. Alternately other liquids which are inert under the usual reaction conditions, such as aliphatic or aromatic hydrocarbons including toluene and xylene, can be added as a diluent and solvent.

Because of the sensitivity of the alkali metal complex to moisture and air, anhydrous reagents are required and the reaction is carried out under an atmosphere of nitrogen, argon, or other inert gas. Reaction temperatures ranging from about 0° to 100° C. can be used depending of course on the stability of the particular alkali metal complex. As noted above, these complexes are stable at temperatures below the melting point of the particular alkali metal. With many aromatic aldehydes the reaction is conveniently and rapidly carried out at about room temperature. To recover the aromatic ester, the alkali metal complex and any residual alkali metal are removed or destroyed by careful addition of alcohol or other suitable material. Then the ester is recovered by distillation, crystallization, or other technique. Within the general scope of the invention described, optimum procedures for a given product can be determined in a routine manner.

To illustrate further the present invention the following examples are given without limitation of invention thereto. Unless otherwise stated all parts and percentages are by weight.

Example I.—Benzyl benzoate

A. To 63.8 parts (0.6 mole) of purified benzaldehyde in a dry reactor blanketed with dry argon was added 5.5 parts (0.07 mole) of tetrahydrofuran purified by distillation from a sodium-naphthalene complex. Then 1.0 part (0.044 mole) of sodium metal was added. The mixture was stirred an hour at room temperature and then for 3 hours to 50° to 55° C. After cooling the reaction mixture was diluted wtih dry benzene. Unreacted sodium metal (0.8 part) was removed and 1-2 parts of methanol added to destroy the sodium complex. Stripping the solvent gave 60 parts of crude benzyl benozate which contained by analysis less than 6% unreacted benzaldehyde. The overall yield of benzoic ester was 92 percent.

B. In a similar experiment, heating purified benzaldehyde with sodium metal in the absence of tetrahydrofuran for 26 hours at 80° C. gave only about a 50 percent yield of benzyl benzoate.

Example II

To a stirred mixture of 31.6 parts (0.23 mole) of o-methoxybenzaldehyde and 2.6 parts of tetrahydrofuran in a reactor blanketed with dry argon, was added with stirring 0.7 part (0.03 mole) of freshly cut sodium metal. The mixture was heated at 55° C. for about 5 hours and then filtered to remove the unreacted sodium. By vapor phase chromatography, about 65% of the aldehyde had been converted into ester. The sodium complex was destroyed with methanol. The light amber liquid obtained on stripping the volatile solvents was dissolved in benzene and purified by column chromatography. The purified liquid o-methoxybenzyl ester of o-anisic acid had a $n_D^{25}$ of 1.5751.

*Analysis.*—Calc. for $C_{16}H_{16}O_4$: C, 70.58; H, 5.88. Found: C, 70.40; H, 5.34.

Example III

To a solution of 20.9 parts (0.015 mole) of p-chlorobenzaldehyde in 250 parts of purified 1,4-dioxane, was added 1.5 parts (0.07 mole) of sodium. The reactants were heated at 85° C. for 100 hours in an inert atmosphere of dry argon. After cooling and removing the unreacted sodium (about 0.6 part) the reaction mixture was filtered to remove 2.5 parts of insoluble impurity. The filtrate was poured into water to precipitate the yellow solid p-chlorobenzyl p-chlorobenzoate, M.P. 70°–72° C. The ester recovered in 60% yield had a minimum purity of 95%.

*Analysis.*—Calc. for $C_{14}H_{10}Cl_2O_2$: C, 59.81; H, 3.59; Cl, 25.2. Found: C, 61.53; H, 4.08; Cl, 22.1.

Example IV

To 10.9 parts (0.08 mole) of recrystallized terephthalaldehyde in a mixture 29 parts of purified tetrahydrofuran and 35 parts of benzene was added 0.6 part (0.02 mole) of sodium metal. After heating at 55 to 70° C. for 16 hours, o-xylene was added and the mixture heated to 90° C. for an additional 26 hours. The reaction mixture was then poured into stirred methanol precipitating a white polymer. The polymer was recovered and dried in a vacuum oven, M.P. 90–95° C. Infrared analysis confirmed its identity as a polyester.

We claim:
1. A process for preparation of an aromatic ester by the catalytic dismutation of aromatic mono- and dialdehydes of the formula:

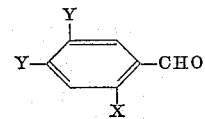

wherein X is selected from the group consisting of hydrogen, chloro, fluoro, nitro, $C_1$–$C_{12}$ alkyl and $C_1$–$C_{12}$ alkoxy groups, and Y is —X or —CHO, which comprises contacting the aromatic aldehyde under essentially anhydrous conditions and an inert atmosphere at about 0–100° C. with an alkali metal complex formed by the interaction of an alkali metal with the aldehyde in the presence of an ether selected from the group consisting of tetrahydrofuran, 1,4-dioxane and saturated aliphatic ethers having not more than 4 carbon atoms per atom of ether oxygen thereby forming an aromatic ester by dismutation of the aldehyde.

2. The process of claim 1 wherein the alkali metal is sodium and the ether an aliphatic methyl ether.

3. The process of claim 1 wherein the ether is tetrahydrofuran.

4. The process of claim 1 wherein the ether is 1,4-dioxane.

5. The process of claim 2 wherein the aldehyde is benzaldehyde.

6. The process of claim 2 wherein the aldehyde is o-methoxybenzaldehyde.

7. The process of claim 2 wherein the aldehyde is p-chlorobenzaldehyde.

8. The process of claim 2 wherein the aldehyde is terephthalaldehyde.

References Cited

Child et al., J.A.C.S., vol. 47 (1925), pp. 798–807.
Kamm et al., "Organic Synthesis," collective vol. 1 (1941), pp. 104–107.

HENRY R. JILES, *Primary Examiner.*

S. WILLIAMS, D. E. STENZEL, *Assistant Examiners.*